United States Patent
Challa et al.

(10) Patent No.: US 6,396,481 B1
(45) Date of Patent: May 28, 2002

(54) APPARATUS AND METHOD FOR PORTABLE HANDWRITING CAPTURE

(75) Inventors: Nagesh Challa, Saratoga; Venkata T. Gobburu, San Jose, both of CA (US)

(73) Assignee: Ecrio Inc., Cupertino, CA (US)

( * ) Notice: Subject to any disclaimer, the term of this patent is extended or adjusted under 35 U.S.C. 154(b) by 0 days.

(21) Appl. No.: 09/294,249

(22) Filed: Apr. 19, 1999

(51) Int. Cl.$^7$ .................................................. G09G 5/00

(52) U.S. Cl. ........................ 345/169; 345/125; 345/158; 345/173; 178/18; 178/19

(58) Field of Search .................................. 345/168, 169, 345/173, 179, 901, 905, 158, 175; 178/18, 19

(56) References Cited

U.S. PATENT DOCUMENTS

| | | | | |
|---|---|---|---|---|
| 4,633,436 A | * | 12/1986 | Flurry | .......................... 364/900 |
| 4,860,372 A | * | 8/1989 | Kuzumuki et al. | .......... 340/708 |
| 5,049,862 A | | 9/1991 | Dao et al. | |

(List continued on next page.)

FOREIGN PATENT DOCUMENTS

| | | |
|---|---|---|
| DE | 197 40 587 A1 | 4/1999 |
| EP | 0 615 209 A2 | 9/1994 |
| EP | 0 618 715 A1 | 10/1994 |
| EP | 0 641 095 A1 | 3/1995 |
| EP | 0 935 383 A1 | 8/1999 |
| WO | WO 95/21436 A1 | 8/1995 |

OTHER PUBLICATIONS

Actual Software Corporation, Products, http://www.actualsoft.com/products.html, printed Apr. 18, 1999.

A.T. Cross Company, CrossPad™ Portable Digital Notepad, 1998.

Novalog, Inc., Data Sheet: SIRComm™ Sirtel™ 115.2kbps IrDA® 1.2a Transceiver Module, Sep. 1998.

Palm Computing, Inc., About Palm Computing, http://www.palm.com/newspromo/corporate/location.html, printed Apr. 18, 1999.

Palm Computing, Inc., Online Store: Cases & Covers: Deluxe Leather Carrying Case, http://palmorder.modusmedia.com/P1/P1–10122U.htm, printed Apr. 18, 1999.

(List continued on next page.)

Primary Examiner—Steven Saras
Assistant Examiner—Alecia D. Nelson
(74) Attorney, Agent, or Firm—Dorsey & Whitney LLP

(57) ABSTRACT

A handwriting capture system combines an image capture device such as a PDA, notebook computer, set top box, smart television, or other type of smart appliance having an image capture capability and a built-in wireless transceiver, with an ink capture device such as, for example, a digital notepad using, for example, electromagnetic, resistivity, or laser digitizing technology and presenting a suitable writing surface such as, for example, a paper writing surface for conventional ink. Communications between the ink capture device and the image capture device is achieved with wireless technology. For image capture devices such as PDAs and notebook computers having built-in infrared ports and designed for personal use, a portfolio is used to carry the ink capture device and the image capture device, and an infrared transceiver module with an infrared port cabled to the ink capture device is mounted on the portfolio so that the infrared port of the module is aligned with the infrared port of the image capture device when the latter is mounted in the portfolio. The image capture device is mounted on the portfolio with retainer clips or by any other releasable mounting technique so that it may be easily removed and used separately. The image of what is written on the sheet of paper is automatically and seamlessly acquired electronically by the digital image capture device.

16 Claims, 9 Drawing Sheets

U.S. PATENT DOCUMENTS

| | | | |
|---|---|---|---|
| 5,051,736 A | * 9/1991 | Bennet et al. | 340/707 |
| 5,105,338 A | 4/1992 | Held | |
| 5,109,354 A | * 4/1992 | Yamashita et al. | 364/708 |
| 5,241,303 A | 8/1993 | Register et al. | |
| 5,243,149 A | * 9/1993 | Comerford et al. | 178/18 |
| 5,287,245 A | * 2/1994 | Lucente et al. | 345/168 |
| 5,440,502 A | 8/1995 | Register | |
| 5,476,336 A | * 12/1995 | Osiecki et al. | 402/79 |
| 5,559,942 A | 9/1996 | Gough et al. | |
| 5,587,560 A | 12/1996 | Crooks et al. | |
| 5,629,499 A | 5/1997 | Flickinger et al. | |
| 5,631,741 A | * 5/1997 | Matthews | 358/296 |
| 5,652,412 A | * 7/1997 | Lazzouni et al. | 178/18 |
| 5,661,506 A | * 8/1997 | Lazzouni et al. | 345/179 |
| 5,712,760 A | * 1/1998 | Coulon et al. | 345/905 |
| 5,737,740 A | 4/1998 | Henderson et al. | |
| 5,739,810 A | * 4/1998 | Merkel | 345/168 |
| 5,901,223 A | * 5/1999 | Wicks et al. | 379/433 |
| 5,949,565 A | * 9/1999 | Ishida | 359/154 |
| 5,995,085 A | * 11/1999 | Bowen | 345/173 |
| 6,054,990 A | 4/2000 | Tran | |
| 6,144,358 A | 11/2000 | Narayanaswamy et al. | |
| 6,157,935 A | 12/2000 | Tran et al. | |
| 6,195,589 B1 | * 2/2001 | Ketcham | 700/28 |
| 6,286,060 B1 | * 9/2001 | DiGiorgio et al. | 710/31 |
| 6,311,042 B1 | * 10/2001 | DeSchrijver | 455/66 |

OTHER PUBLICATIONS

Palm Computing, Inc., Online Store: Cases & Covers: Dooney & Bourke® Portfolio, http://palmorder.modusmedia.com/P1/P1–10132U.htm, printed Apr. 18, 1999.

Smartcode Software, Inc., Company Information & Communication Software for Mobile Professionals, http://www.smartcodesoft.com/products/handhelds/hh_products.html, printed Apr. 18, 1999.

Stevens Creek Software, PalmPrint, http://www.stevenscreek.com/pilot/palmprint.shtml, printed Apr. 18, 1999.

Texas Instruments, Inc., Data Sheet: TIR1000, TIR1000I Standalone IrDA™ Encoder and Decoder, May 1998.

Vishay Telefunken, Data Sheet: Integrated Interface Circuits: TOIM3232, Oct. 1998.

* cited by examiner

APPARATUS AND METHOD FOR PORTABLE HANDWRITING CAPTURE

BACKGROUND OF THE INVENTION

1. Field of the Invention

The present invention relates to handwriting capture apparatus and methods, and more particularly to handwriting capture apparatus and methods using digital image capture devices such as, for example, portable smart appliances.

2. Description of Related Art

Handwriting, or forming script, drawings, marks, words, pictures, sketches, diagrams, and the like with the human hand using a marking tool on a receptive medium such as paper, is the oldest, most natural solution for capturing information quickly, and is is truly personal as well as portable. Even today, with so many "smart" appliances in the market ranging from personal digital assistants, or "PDAs," calculators, notebook computers, desktop personal computers, set top boxes, smart televisions, and various other types of appliances that incorporate computing devices, most of us nonetheless reach for a pen and paper to jot down notes quickly. In fact the pen and paper notebook or notepad are the most commonly used instruments in meetings, even among computer savvy professionals.

Unfortunately, entry of written notes into smart appliances is cumbersome. For example, personal computers ("PCs") including laptops use keyboards for primary data entry, and any notes that we may have written down on paper have to be entered using the keyboard or an attached bulky digital scanner. This includes meeting minutes, quick notes we may have written down, and random bits of information such as telephone numbers, directions, telephone conversation notes, and so forth. Even electronic mail, which is the most widely used application on the World Wide Web, or the Internet, is typically prepared at least in part by typing on a keyboard. Moreover, most keyboards are designed for the English language and so do not support the underlying philosophy of the Internet with which many smart appliances are networked; viz., to provide ubiquity and enable communications on a Global level. The problem is exacerbated in portable smart appliances, including PDAs such as the Palm™ family of connected organizers and the numerous Windows CE-based devices, since these devices use touch screen keyboards, cramped mechanical keyboards, and/or single character stylus entry screens which are cumbersome and limiting for all but the most rudimentary data entry tasks. Moreover, free form handwriting recognition has not been successfully implemented on portable smart appliances.

Numerous other types of data input devices are available, but each has its own disadvantages when used to capture handwritten notes. Digitizing tablets are commonly available, but tend to be bulky and hence unsuitable for portable operation with portable smart appliances. Moreover, digitizing tables use an inkless stylus to "write" on the tablet, requiring the user to look at the monitor of the attached computer while writing. This is akin to writing with a mouse, and does not afford the common person a familiar and comfortable feel.

PDAs commonly use a small digitizing region of their displays for receiving stylus input in the form of individual characters, and in some cases require special alphabets. Neither the special alphabet, nor forming of plural characters one at a time in the same space, or the feel of the inkless stylus is natural or comfortable to the common person.

The CrossPad™ portable digital notepad, which is available from A. T. Cross Company of Lincoln, R.I., empowers a user to capture his or her thoughts with ink on paper, and to store the writings digitally in the memory of the notepad. Many pages of notes can be stored in the memory of the digital notepad, and an existing page can be added to by opening the desired digital page using controls on the digital notepad, and then replacing the correct actual inked physical page over the pad. Since the digital page is not viewable in real time, the operator could open the wrong digital page and co-mingle writings, both obfuscate material on the original page and the new material. Rather than being viewable in real time, the digital notes are transferred from the memory of the notepad to the user's PC over a thin cable that connects to the RS232 port on the PC. Using Ink Manager software available from IBM Corporation of Armonk, N.Y., the user is able to use his or her personal computer to look at the digital notes, to organize the digital notes in one place in "notebook" files, to assign keyword, bookmark, and date to notes and search them, to convert selected words and phrases to text, to cut and paste notes or sketches into a variety of Microsoft Windows™ operation system applications, and to share notes by e-mail directly from the PC. As useful as the portable digital notepad is for capturing ink, the need to tether the digital notepad to a separate desktop or laptop PC to view, manipulate and communicate the digital notes limits the usefulness and appeal of the digital notepad.

SUMMARY OF THE INVENTION

A need, therefore, exists for apparatus and methods to digitally capture, manipulate, and communicate natural handwritten information without many of the disadvantages of known methods and apparatus.

Accordingly, an object of the present invention as realized in particular embodiments is to enable the digital capture, manipulation, and/or communication of natural handwritten information in real time.

Accordingly, another object of the present invention as realized in particular embodiments is to digitally capture natural handwritten information seamlessly in real time.

Accordingly, another object of the present invention as realized in particular embodiments is to digitally capture natural handwritten information in a portable manner.

Yet another object of the present invention as realized in particular embodiments is to provide the user with the natural and familiar feel of handwriting for inputting information in digital form.

These and other objects are achieved in the various embodiments of the present invention. For example, one embodiment of the present invention comprises a portable handwriting capture apparatus for use with a portable image capture device having an infrared port, comprising a structural supporting medium; an ink capture device mounted on the structural supporting medium; an infrared port module mounted on the structural supporting medium; an infrared communications circuit wired to the ink capture device and having an infrared transceiver mounted in the infrared port module; and an image capture device mounting mechanism, the infrared port of the infrared port module being directed toward the capture device mounting mechanism.

Another embodiment of the present invention, a portable handwriting capture apparatus for use with a portable image capture device having a keyboard and an infrared port, comprises a structural supporting medium; an ink capture device mounted on the structural supporting medium; a stand extendable from the structural supporting medium to provide clearance over the keyboard of the image capture device; an infrared port module; a cable coupled between the infrared port module and the structural supporting medium; and an infrared communications circuit wired to the ink capture device and having an infrared transceiver mounted in the infrared port module.

Yet another embodiment of the present invention, a portable handwriting capture apparatus for use with a portable image capture device having an infrared port, comprises a structural supporting medium having a front side and a back side, the back side having a cavity therein to receive the image capture device; an ink capture device mounted on the front side of the structural supporting medium; and an infrared communications circuit wired to the ink capture device and having an infrared transceiver directed into the cavity.

DETAILED DESCRIPTION OF THE PREFERRED EMBODIMENT

Figure 1:
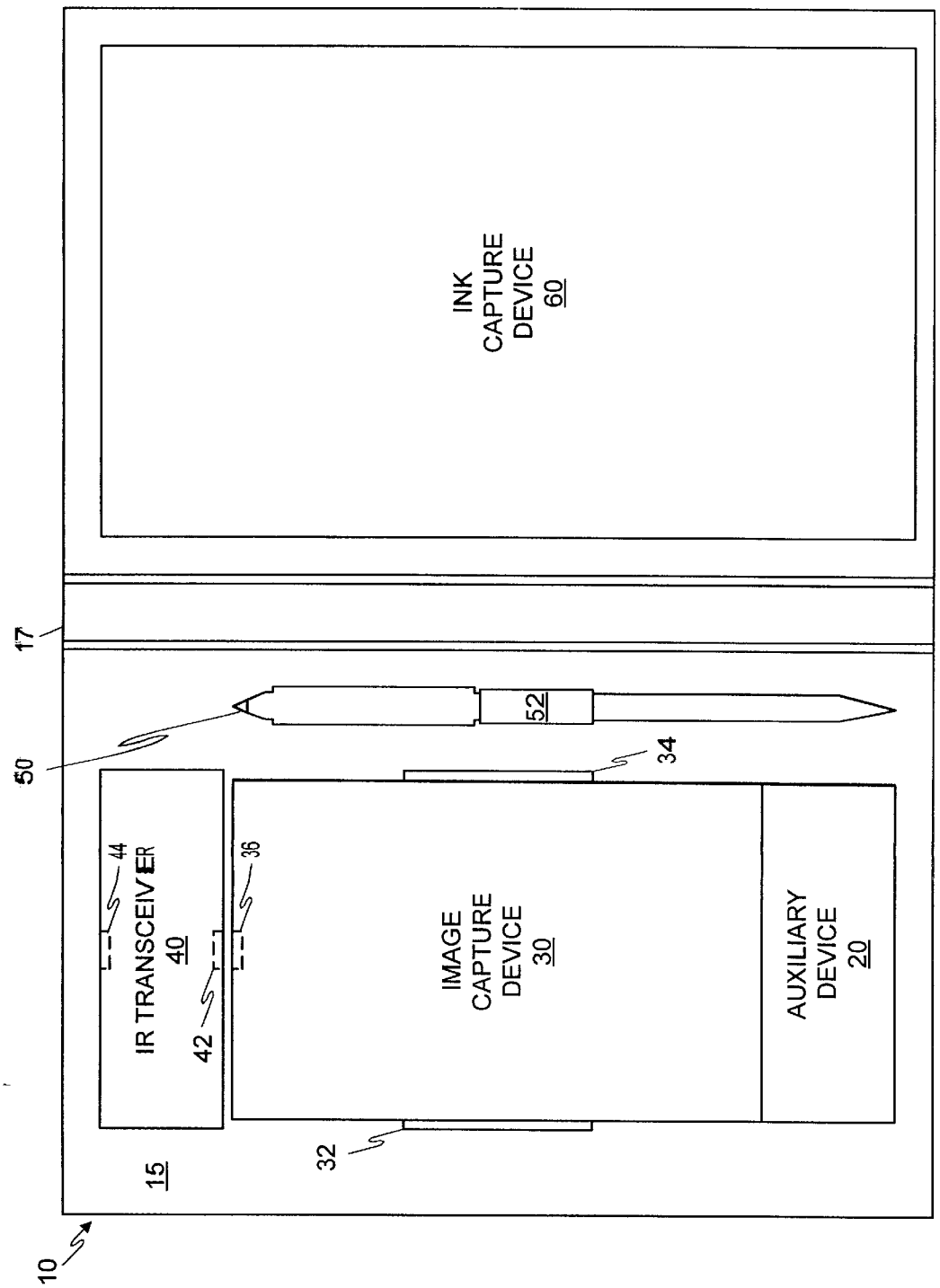
FIG. 1 is a schematic view of several elements of a handwriting capture system in accordance with various embodiments of the present invention, as implemented with a Personal Data Assistant.
Figure 2:
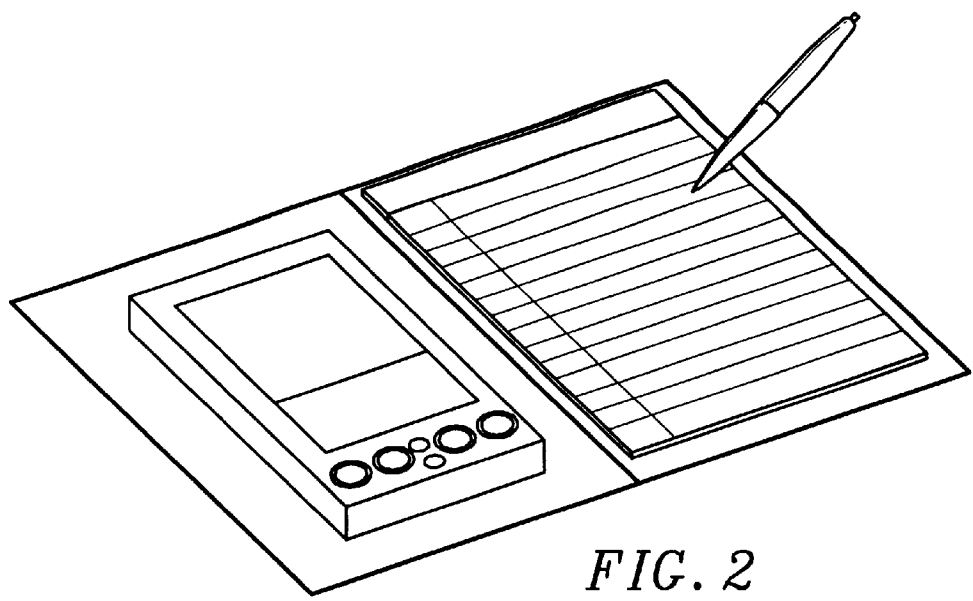
FIG. 2 is a perspective view of the handwriting capture system of FIG. 1.

An illustrative arrangement of a handwriting capture system 10 is shown in FIG. 1. A portfolio 15 organizes the various components of the handwriting capture system 10 into a conveniently portable, functional, and attractive arrangement. Using a pen 50 which has an "inked" writing tip, the user writes on an "ink" capture device 60. The image of what is written on the sheet of paper is preferably automatically and seamlessly acquired electronically by a digital image capture device 30. The ink capture device 60 is arranged on the portfolio 15 for convenient note taking by the user, and the image capture device 30 is arranged on the portfolio 15 for convenient command entry by the user. Communication between the ink capture device 60 and the image capture device 30 is by wireless technology.

The ink capture device 60 presents a writing surface that visually displays impressions made on it. Preferably, the ink capture device 60 presents a removable paper writing surface to the pen 50, so that the user experiences a comfortable and familiar feel of pen/pencil on paper as he or she writes on the ink capture device 60 with conventional ink.

Alternatively, if a true "pen/pencil on paper" feel is not required or desired, any other surface and associated marking instrument for making visual perceivable impressions may be used. Examples of other suitable papers and inks include a whiteboard type surface where the ink is an erasable ink, and a plastic sheet that visualizes impressions by making contact with an underlying surface under the pressure of a stylus where the ink is the lines of contact between the plastic and the underlying surface.

Preferably, the digital image capture device 30 merges the handwriting received from the ink capture device 60 onto a template that is user-selectable and/or configurable (customizable) by the image capture device 30, such as, for example, an address book, calendar, memorandum, or "to do" list template. When the present image is completed and captured, a new sheet is realized physically by, for example, removing or flipping up the present paper sheet on the ink capture device 60 to expose a fresh paper sheet, or for the whiteboard by swiping a dry eraser over the whiteboard surface, or for the plastic sheet by simply raising and then lowering the plastic sheet back on the underlying surface, and electronically by initiating a new screen or blank template on the image capture device 30.

The images stored on the digital image capture device 30 are useful in a wide variety of ways depending on the capabilities of the particular image capture device used and the interests of the user. Image capture devices are known that are able, for example, to assign tags or names to digital images, to store and organize digital images, to redisplay digital images on built-in screens, to communicate stored digital images in a variety of ways, such as over cables, over wired and wireless networks, and over hybrid networks such as the World Wide Web, to communicate digital images by electronic mail, or perform a combination of these actions as well as other organization, communication and display actions.

Because of successful miniaturization of computing, display and communications functions, a wide variety of devices are presently available that are able to perform digital image capture in addition to a variety of other functions, and even more powerful and/or cost effective designs are expected to be developed. Presently, a number of different types of personal data assistants (PDAs) running under proprietary operating systems or the Microsoft Windows CE™ operating system devices are available from various manufacture's and are in widespread use today. While the handwriting capture system 10 is described below with reference to a particular model of PDA, it will be understood that the image capture device 30 is not limited to that particular model or even type, but may be any type of device having image capture capabilities and an appropriate form factor for mounting in a suitable integrating structure with an ink capture device, including, for example, other types of PDAs, notebook computers, digital cameras, consumer wireless internet access devices ("CADs"), personal communication system ("PCS") multi-function wireless phones, computing or "smart" appliances, and so forth.

As the handwriting capture system 10 includes an infrared port module 40, image capture devices having infrared ports are particularly suitable for use in the handwriting capture system 10 since they need only be mechanically secured to the portfolio 15 to become physically and electronically fully integrated into the handwriting capture system 10. As image capture devices suitable for the handwriting capture system typically are suitable for other independent applications, they are easily and entirely removed from the handwriting capture system when desired merely by reversing the mechanical coupling. Moreover, many of the image capture devices suitable for the handwriting capture system have one or more electrical hardwire ports which are available for use even while the infrared port 36 of the image capture device 30 is engaged. For example, PDAs typically have ports to which modems may be attached, so that the PDA may maintain wireless communications while fully functioning in the handwriting capture system 10 through the infrared port 36.

While the handwriting capture system 10 is described below with reference to a particular type of ink capture device, namely an electromagnetic pad, it will be understood that the ink capture device 60 is not limited to that particular type, but may be any type of device having the ability to digitally capture writing/drawing strokes and an appropriate form factor for mounting in a suitable integrating structure with the image capture device. The ink capture device 60 has a number of sheets of ordinary writing paper mounted over a digital object position sensing device. A pen 50 has an ordinary writing tip and is suitably engineered to have its position tracked as it is used for writing on the paper in the ink capture device 60. When the digitizer is based on, for example, electromagnetic position sensing technology, the pen 50 is provided with a small internally battery powered electromagnetic transmitter internally mounted near the tip. When the digitizer is responsive to pressure (resistivity), the pen 50 need be no more than an ordinary pen or pencil. When the digitizer uses laser tracking, the pen 50 is provided with a suitable target material at the tip. Digitizers based on electromagnetic and laser technologies typically accommodate thick pads of paper, while digitizers based on resistivity technologies typically tolerate just a few sheets of paper. Regardless of the digitizing technology used, the writing tip preferably is a standard ink ball point, but the terms "ink" and "writing tip" are used broadly herein to mean any type of writing or marking tip such as felt marker, pencil lead, plastic channeled, fountain, and so forth. The pen 50 may also be provided with a stylus tip on the other end, allowing it to substitute for the stylus commonly provided with various types of PDAs.

As shown in FIG. 1, the image capture device 30 and the ink capture device 60 are mounted on respective panels of a bi-fold portfolio 15. Illustratively, the image capture device 30 shown in FIG. 1 is, for example, one of the various popular PDAs of the Palm™ family of connected organizers, which are available from Palm Computing, Inc. of Santa Clara, Calif. Illustratively, the ink capture device 60 shown in FIG. 1 is, for example, an electromagnetic type of portable digital notepad of which the CrossPad™ portable digital notepad, available from A. T. Cross Company of Lincoln, R.I., is an example. The PDA is retained on its section of the portfolio 15 in any suitable manner, as with retainer clips 32 and 34. An example of a retainer clip is found in a Dooney & Bourke® portfolio available from Palm Computing. Any other mounting technique may be used, provided it securely engages and disengages the image capture device 30 quickly and easily; examples include Velcro™ straps, elastic straps, fabric jackets, pouches, and so forth. An example of a pouch is found in the deluxe leather carrying case available from Palm Computing. The electromagnetic sensing array and various control circuits, buffers, and a microprocessor (not shown) of the digital notepad is built into its section of the portfolio 15. It will be appreciated that as the image capture device 30 is used for image storage, the ink capture device 60 need have only a relatively small amount of on-board scratchpad memory and buffer memory for managing the flow of digital information to the image capture device 30. An ordinary writing pad is mounted over the digital pad simply by slipping the cardboard backing of the writing pad into a slit, although any of numerous other well known pad mounting techniques may be used as well, and other types of writing surfaces may be used as well. The portfolio 15 is constructed of any suitable material, typically a soft leather or simulated leather. In the bi-fold arrangement shown in FIG. 1, each section of the portfolio 15 is rigid and hinged about a spine 22, which illustratively includes a battery compartment for powering the digitizer 60, the infrared port module 40, and other electronic components of the handwriting capture system 10 requiring power. The portfolio 15 may be any desired size, although typical sizes are 7×10 to accommodate a 5×8 pad and 10×13 to accommodate an 8½ by 11 letter-size pad.

The ink capture device 60 and the image capture device 30 communicate over preferably a bidirectional infrared link by which image data is communicated from the ink capture device 60 to the image capture device 30 and various control and status signals are communicated between the ink capture device 60 and the image capture device 30 for such purposes as, for example, querying portfolio battery life, testing the ink capture device 60, and adjusting the infrared transceiver power level. An infrared port module 40 having an infrared port 42 is mounted on the portfolio 15 so that the infrared port 42 is preferably adjacent to the infrared port 36 of the image capture device 30 as the later is retained in the portfolio 15. Any additional electronics needed for the infrared link (see, e.g., infrared interface 230 in FIG. 3) may be mounted either in the infrared port module 40 or in any other convenient place in the portfolio 15, including the spine 17. Connections between the infrared port 42, the image capture device 60, the power supply in the spine, and any other related electronics is by any suitable low profile wiring such as, for example, commonly available flat ribbon cable. Although the infrared ports 36 and 42 need only be in line of sight, an adjacent relationship is preferred to avoid interference by intermittently intervening objects and other IR waves, and to minimize power requirements.

Since only the infrared port 36 on the image capture device 30 is necessary for communication with the ink capture device 60, all other ports built into the PDA 36 are available for other purposes. Typically, these other purposes are implemented by attachments, as represented by auxiliary device 20 in FIG. 1. For example, where the image capture device 30 is a PDA, the auxiliary device 20 may be a modem attached to the accessories port of the PDA. Preferably, the modem is operational even while handwriting is being captured, a particularly useful feature for creating immediate "on-the-fly" email messages when, for example, responding to an incoming email message.

Figure 3:
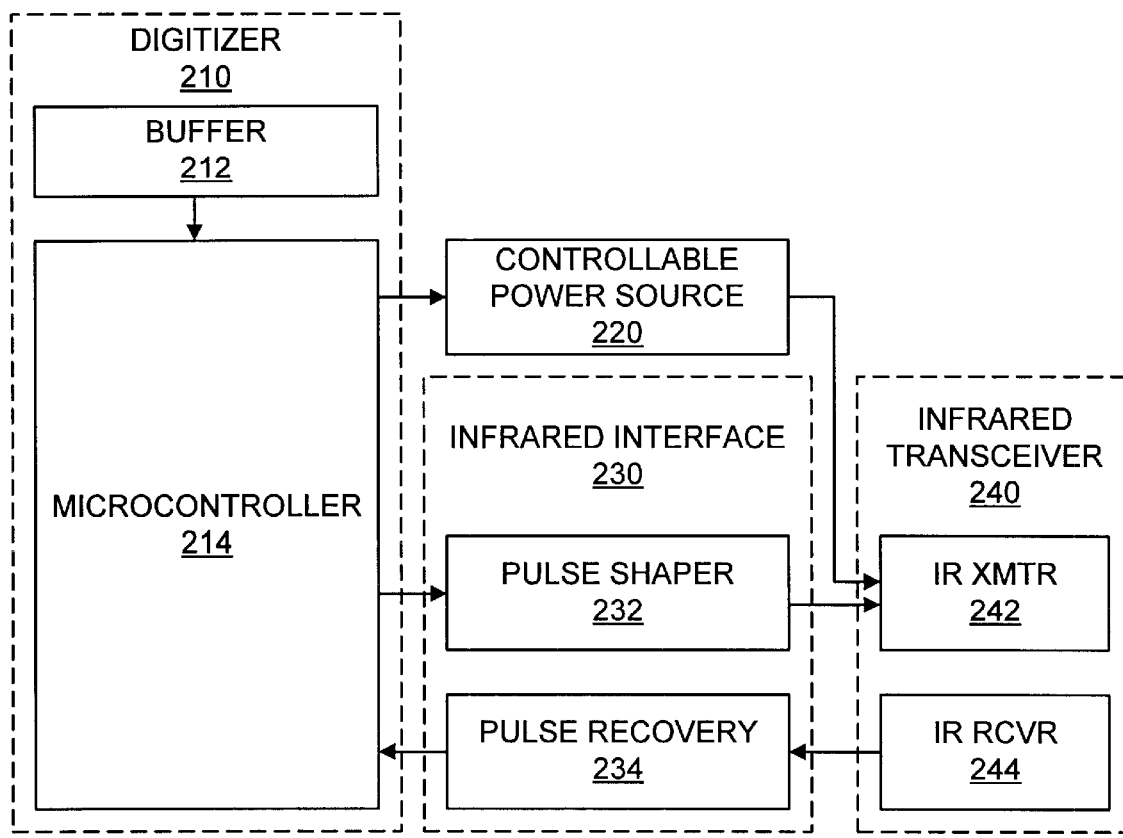
FIG. 3 is a schematic block diagram of an infrared transceiver useful in various embodiments of the present invention.

An illustrative circuit for realizing the infrared capabilities of the handwriting capture system 10 is shown in FIG. 3. A digitizer 210 includes buffer memory 212 and a microcontroller 214. The microcontroller 214 controls the assembly and timing of the digital signals that are sent to the image capture device 30 through a pulse shaper 232 in an infrared interface 230 and an infrared transmitter 242 in an infrared transceiver 240, as well as the reconstruction and processing of digital signals that are received from the image capture device 30 through an infrared receiver 244 in the infrared transceiver 240 and a pulse recovery circuit 234 in the infrared interface 230. Circuits for realizing the infrared interface 230 and the infrared transceiver 240 are well known in the art, and include, for example, the SIRComm™ SIRtel™ 115.2 kbps IDA® 1.2a transceiver module available from Novalog, Inc. of Costa Mesa, Calif. and the type TOIM3232 IC pulse shaper, a type of ENDEC (encoder-decoder), available from Vishay Semiconductor GmbH of Hellbronn, Germany. The microcontroller 214 also controls the power level of the infrared transmitter 242 by calculating the appropriate power level based on the baud rate employed and the results of the power setting routine shown in FIG. 5, and furnishing control signals to a controllable power source 220. The controllable power source 220 may be any controllable power source such as, for example, well known digitally controlled current sources.

Figure 4:
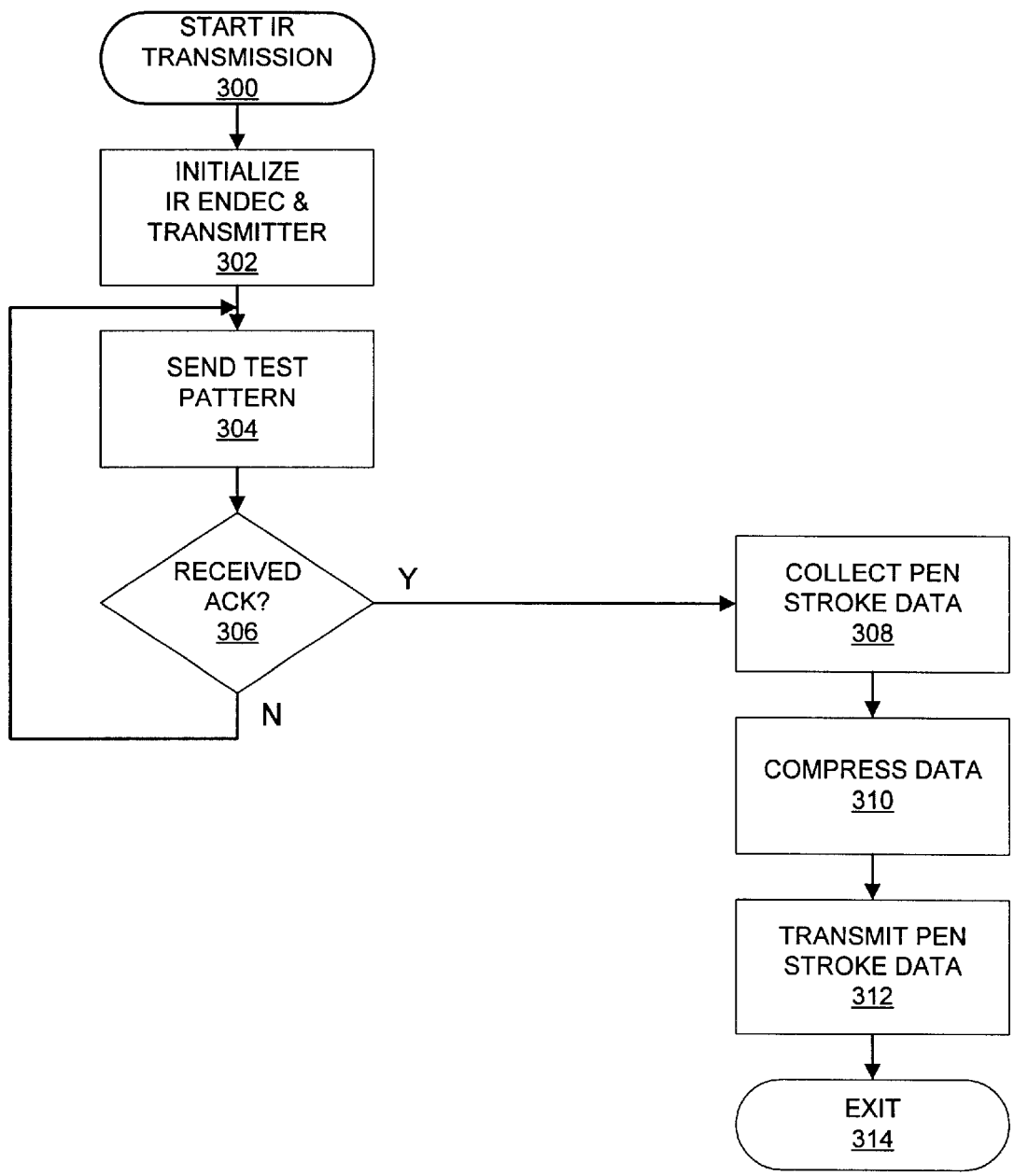
FIG. 4 is a flow diagram illustrating a typical mode of operation for the infrared transceiver of FIG. 3.

Infrared transmissions from the ink capture device 60 are controlled in any desired manner; an example is shown in FIG. 4. The infrared ENDEC and transmitter are initialized in step 302, which involves specifying or establishing a suitable baud rate. A test pattern is sent to the image capture device 60 in step 304, and the microprocessor 214 (FIG. 3) monitors for an acknowledgement signal from the image capture device 60. If none is received within a preset amount of time, the test pattern is again sent (step 304) and receipt of acknowledgement monitored (step 306). When an acknowledgement signal is received, pen stroke data is collected from the buffer memory 212 by the microprocessor 214 (step 308), compressed in any desired manner (step 310), and then transmitted over the infrared link to the image capture device 60. A variety of well know compression techniques are suitable, including delta or differential compression.

Figure 5:
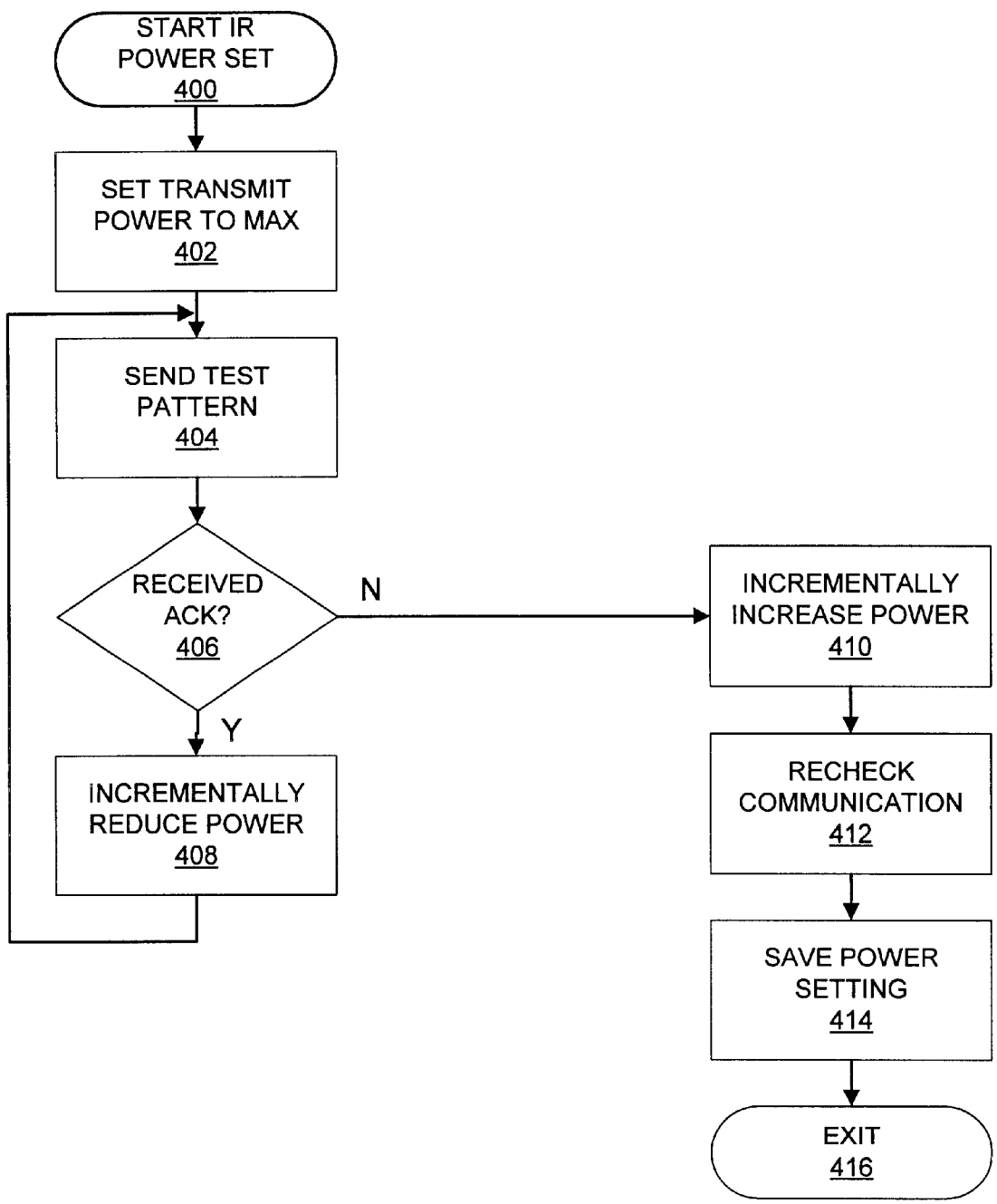
FIG. 5 is a flow diagram illustrating a power setting mode of operation for the infrared transceiver of FIG. 3.

To maximize battery life, the microprocessor 214 executes a power setting routine after the image capture device 30 is inserted into the portfolio 15; an example is shown in FIG. 5. The infrared ENDEC and transmitter are initialized in step 402 and a test pattern is sent to the image capture device 60 in step 404. The microprocessor 214 (FIG. 3) monitors for an acknowledgement signal from the image capture device 60. If an acknowledgement signal is received, the microprocessor 214 incrementally reduces power (step 408) and again sends out a test pattern (step 404). This loop is repeated until no acknowledgement is received within a preset amount of time. In this event, the power setting is incrementally increased (step 410), the test pattern is again sent to ensure that the new power level is sufficient for reliable communications (step 412), and the power setting is saved (step 414).

While image capture devices such as the Palm family of connected organizers do not include the capability of optimizing the power of their IR port, such a capability could well be provided in accordance with the foregoing description to maximize battery life of the image capture device.

The handwriting capture system 10 using a PDA such as the Palm connected organizer has a number of useful features, as illustrated by the following non-limiting list of examples.

(1) The cost of the digitizer is reduced by having all captured ink stored on the PDA, in effect both constructing a digital image of the written material and storing the completed image on the PDA. However, it will be appreciated that if desired, the ink capture device 60 may itself store the various pen strokes in its own circuitry or on associated circuitry located elsewhere on the portfolio 15 until the image is completed, and then transfer a digital file containing the completed image to the image capture device 30 for subsequent processing and/or storage.

(2) All built-in applications of the PDA are visible to the digitizer. Included are the Memo, Address Book, and the To Do List applications. These applications behave as they normally do on the PDA but are enhanced by having direct access to the digitizer.

(3) Attachment of the PDA is simple and the electronic connectivity is transparent to the user.

(4) Handwritten notes are capable of being easily and immediately communicated to others by fax or email, and easily communicated to others by beaming or printing.

(5) Power requirements of the electromagnetic digitizer and infrared transceiver are modest, requiring just two AAA batteries for about two months of normal usage.

(6) Connectivity of the handwriting capture system 10 to a desktop system is through a suitable connector such as an RS232 connector (not shown), which may be mounted in the spine 17 and facing up when the portfolio 15 is open, or mounted elsewhere in the portfolio 15 as desired. The availability of a standard port such as the RS232 connector allows the handwriting capture system 10 to be easily connected to a corresponding port of a desktop computer or to the PDA cradle for synchronization of the PDA. The other end of the connector terminates in a pass-through connector (not shown), one port of which is for connecting to the PDA and the other of which is for connecting to the auxiliary device 20. Use of the RS232 connector is illustrative, as any desired connector may be provided to the handwriting capture system 10, including, for example, USB and Firewire (IEEE Standard 1394).

Depending on the particular type of image capture device 30 used, many of its built in applications are capable of being enhanced by the ink capture device 60. For example, the various built-in functions of a PDA such as the Palm connected organizer are enhanced by the digitizer in the following exemplary and non-limiting manner.

The handwriting capture application is launched either by tapping on any of the built in application keys of Memo, To Do, Calendar, or Address Book, where the keys have been reassigned for the handwriting capture application; or by tapping on the Home key and selecting the handwriting capture application icon. Keys are reassigned and the handwriting capture icon implemented in any suitable manner. For example, the Palm connected organizer provides a user configuration dialogue box allowing the user to call up any application such as software for the handwriting capture application, the software having been previous downloaded over a serial cable from the Palm cradle or an IR link to a PC in a manner well known in the art. Ink capture is directed to the selected application until explicitly redirected.

When the memo pad application is invoked, the PDA displays the last used view. If the last used view is a list view, a list of all of the memos presently stored in the PDA is displayed, including those captured through the PDA's stylus entry using the Graffiti alphabet as well as those captured from ink. If the last used view was the detailed view of a memo, then the particular memo is displayed.

The handwriting capture application modifies the list view by adding the following features. An icon "New" at the bottom allows the user to create a new memo by tapping the icon to open a new memo in detailed view and begin input, the handwriting capture application functioning to identify the input source and create the memo as an ASCII memo if stylus input is detected and create the memo as an image memo if ink capture input is detected. An indicator shows the battery status of the digitizer, typically as a percentage. Any pre-existing memo in the list view may be selected by tapping the name, in which event the memo opens into detailed view to receive stylus input if originally an ASCII memo and ink capture input if an image memo. An new image memo may also be opened in detailed view just by begin to write on the ink capture device 60.

When open in detailed view, an image memo captures all writing made to a particular sheet of paper on the top of the pad and displays icons for various control functions, such as, for example, Done, Details, Zoom, Next Page, Previous Page, and Page Number. Panning of the image is achieved by placing the stylus tip inside of the displayed image and dragging the stylus in the desired panning direction. Tapping on the Done icon closes the detailed view and displays the List View for the Memo application.

As with ASCII memos, image memos are capable of being assigned titles, categorized into particular folders, and deleted. The title of an image memo is displayed as a tab in the top left of the screen. The default title for an image memo is "Untitled <Creation Date>." The title is changed by tapping on the Title tab, which brings up a suitable dialogue box. A Folder tab is displayed as a tab in the top right of the screen. Categorizing a memo is done either by tapping on the Folder tap or by tapping on the Details icon and then the Folders icon in the Details pop up screen, which brings up a suitable dialogue box. An image memo is deleted by tapping the Details icon and then tapping the Delete icon in the Details pop up screen.

The handwriting capture application modifies the Address Book view by adding the following features. The startup view for the Address Book application is a list view, which displays a list of existing Address Book entries, an indication of which entries have one or more images attached as Address Book Notes ("AB_Notes"), a "Notes" icon, and an icon "New" at the bottom. Tapping on the entry in list view brings up a detailed view of an existing Address Book entry. Tapping on the Notes icon brings up a detailed view of the AB_Notes associated with the entry. Tapping the New icon creates a new Address Book entry allowing the user to enter address information in ASCII form and create a new AB_Note that is automatically associated with the new Address Book entry. The handwriting capture application identifies the input source and enters it into the notes section as ASCII information if stylus input is detected or creates a the new AB_Note if ink capture input is detected. If the user simply begins to write on the ink capture device 60 after invoking address book mode, the handwriting capture application launches a detailed view of a new, unassociated and blank AB_Note. All ink entered is captured into the new AB_Note until the user changes the application that has visibility to the ink capture device 60. The new AB_Note is assigned the default title "Untitled <Creation Date>" which is displayed as a tab in the top left of the screen. The title is changed by tapping on the Title tab, which brings up a suitable dialogue box in which a title is entered using stylus input. The detailed view of the AB_Note has an icon based provision to allow a previously created AB_Note to be associated with any particular Address Book entry or set of entries. Tapping on the icon brings up a list of the address book entries for selection by the user.

The Address Book application works with the Memo application in the following manner. The detailed view for a selected Address Book entry includes an icon that captures the entire ASCII contents of the entry into a newly created memo that is automatically titled the same as the Address Book entry and becomes viewable from the Memo application. The Memo application is also capable of viewing all existing AB_Notes. Each AB_Note created in this manner is initially stored in the "Unfiled" category but is assigned a title that indicate its origin from the Address Book application along with the creation date and time. The user may choose how to categorize the AB_Note.

The handwriting capture application modifies the To Do List view by adding the following features. The startup view for the Address Book application is a list view displaying all of the open items, whether entered as stylus input or ink capture input. List view for the to do list functions in a manner similar to list view for the address book, in that when a new list item is created the handwriting capture application identifies the input source and enters it as ASCII information if stylus input is detected or creates a new blank To Do List Note TDL_Note associated with the new list item if ink capture input is detected. If the user simply begins to write on the ink capture device 60 after invoking to do list mode, a new blank unassociated To Do List Note TDL_Note is created and assigned the default title "Untitled <Creation Date>" which is displayed as a tab in the top left of the screen. The title is changed by tapping on the Title tab, which brings up a suitable dialogue box in which a title is entered using stylus input. The title is used to identify a specific TDL_Note in the list view.

The detailed view of the TDL_Note includes icons for Done, Due Date, and Priority, which are used to enter ASCII information to the list item in a conventional manner. At the end of composing the TDL_Note, the user taps on the Done icon to close the note and go back to the list view.

The To Do List application works with the Memo application in the following manner. The detailed view for a selected To Do List entry includes an icon that captures the entire ASCII contents of the entry into a newly created memo that is automatically titled the same as the To Do List entry and viewed from the Memo application. The Memo application is also capable of viewing all existing TDL_Notes, which are placed in the category TDL_Items. Each TDL_Note created in this manner is initially stored in the "Unfiled" category but is assigned a title that indicate its origin from the To Do List application along with the creation date and time. The user may choose to categorize the TDL_Note.

The handwriting capture application modifies the Calendar view by adding the following features. The startup view for the Calendar application is a list view displaying all of the events scheduled for the day and a New icon at the bottom of the screen. Tapping the New icon opens a dialogue allowing the user to select the time for the calendar event and create a note using either stylus input or ink capture input. The handwriting capture application identifies the input source and enters it as ASCII information if stylus input is detected or creates a new blank Calendar Note C_Note associated with the particular calendar event if ink capture input is detected. If the user immediately begins writing on the ink capture device 60 after invoking Calendar view, the handwriting capture application identifies the ink capture input and creates a new blank unassociated C_Note. The detailed view of the C_Note includes an icon for Done, which closes the note and go back to the list view for the user to enter an ASCII title using stylus input.

The Calendar application works with the Memo application in the following manner. The detailed view for a selected Calendar entry includes an icon that captures the entire ASCII contents of the entry into a newly created memo that is automatically titled the same as the Calendar entry and viewed from the Memo application. The Memo application is also capable of viewing all C_Notes. Each C_Note created in this manner is initially stored in the "Unfiled" category but is assigned a title that indicate its origin from the Calendar application along with the creation date and time. The user may choose to categorize the C_Note.

Email transmission of any image memo or note created with the handwriting capture system 10 is achieved by using any suitable email applications, including, for example, Multi-Mail, which is available from Actual Software Corporation of Andover, Mass., and HandMail, which is available from Smartcode Software, Inc. of San Diego, Calif. Multi-Mail, for example, provides the ability to attach any memo to an outgoing email. The image memo is first converted into a transient JPEG or other small footprint format file, and then attached to the email, and then converted back into the image format of the PDA when received.

Faxing an image note is achieved by providing a plug-in that creates a TIFF file that is faxed out from a fax application such as HandFax, which is available from Smartcode Software, Inc. of San Diego, Calif.

Beaming an image note from one PDA to another is achieved over an infrared link using the standard capabilities of the PDAs. The image memo is converted into a transient JPEG or other small footprint format file at the transmitting PDA and then converted back into the image format of the receiving PDA when received.

Printing of an image memo is achieved from, for example, copying an image memo to a desktop computer and printing it on a local printer using standard desktop image viewing or word processing applications. Alternatively, software is available to convert the image memo to a suitable printer format and beaming the converted image memo directly from the PDA to a printer having an infrared port. Suitable software includes PalmPrint, which is available from Stevens Creek Software of Cupertino, Calif.

Figure 6:
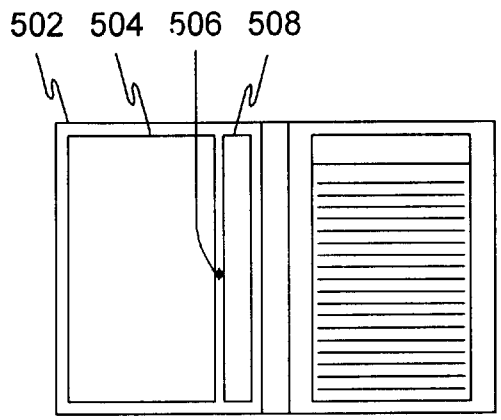
FIGS. 6 and 7 are schematic views of variations in a handwriting capture system in accordance with the present invention.
Figure 7:
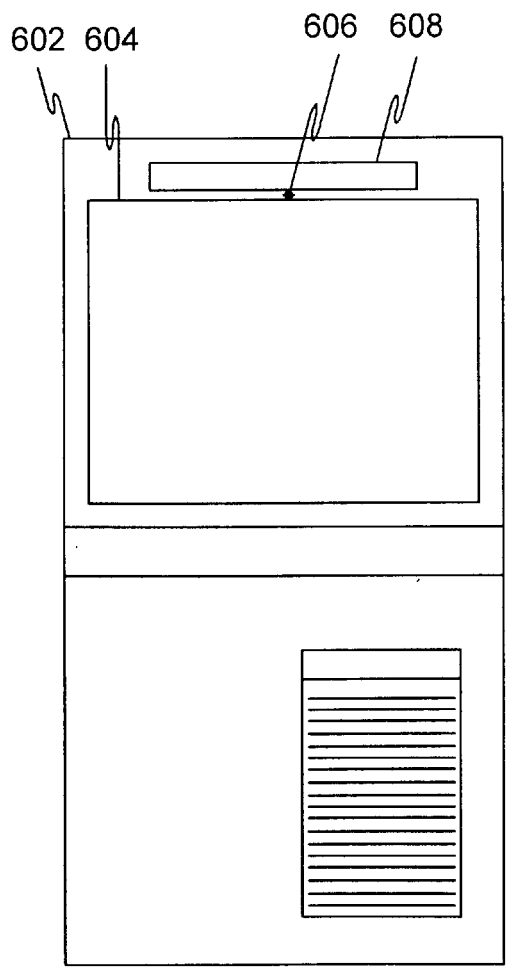
Figure 8:
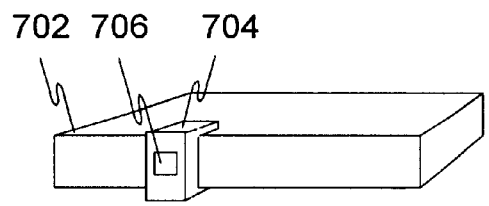
FIG. 8 is a perspective view of an infrared port module having a sliding head.

An infrared port module may be fixed in place on a portfolio and designed for one type of image capture device, a family of image capture devices, or image capture devices of generally similar form factor. FIG. 6, for example, shows a PDA 504 which is mounted on a portfolio 502 and communicates with an infrared module 508 mounted on the portfolio 502 over infrared link 506 established with a side mounted infrared port. FIG. 7 shows a notebook computer 604 which is mounted on a portfolio 602 and communicates with an infrared module 608 mounted on the portfolio 602 over infrared link 606 established with a back mounted infrared port. FIG. 8 shows an infrared port module 702 that has a sliding head 704 that contains an infrared port 706, which will adapt to image capture devices of generally similar form factors but having their infrared ports located in different places. The sliding head 704 contains the infrared transceiver and is electrically connected to other infrared system electronics (not shown) through any suitable technique, including such well known techniques as ribbon cable and conductive tracks.

Figure 9:
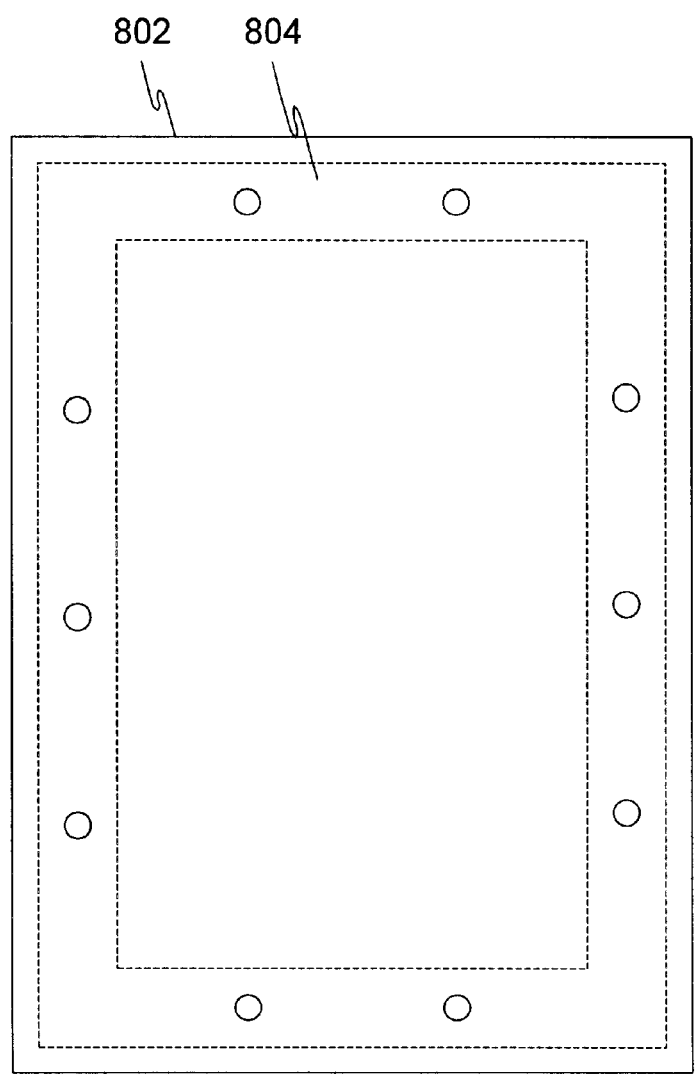
FIG. 9 is a plan view of an portfolio section having the ability to receive an infrared port module in different locations thereon.

Alternatively, an infrared port module may be movable from place to place on a portfolio and designed for to adapt to a variety of different types of image capture devices For example, the infrared port module 702 (FIG. 8) and a portfolio 802 (FIG. 9) are provided with complementary mechanisms that allow the user to locate the infrared port module 702 on the top or the side of a portfolio panel as desired, thereby providing a universal infrared linking system. FIG. 9 shows a portfolio panel 802 provided with a reinforced internal frame 804 which contains holes or other structures to cooperate with latches, screws or other complementary structures (not shown) in a modified infrared port. module 702 to hold the modified infrared port module 702 securely in a location selected by the user. Another suitable technique is a channel slider with lock pin. Other techniques may also be used.

Figure 10:
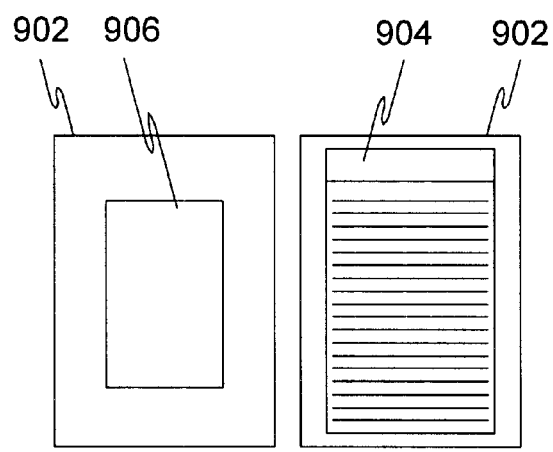
FIGS. 10 through 13 are schematic views of variations in a handwriting capture system in accordance with the present invention.
Figure 11:
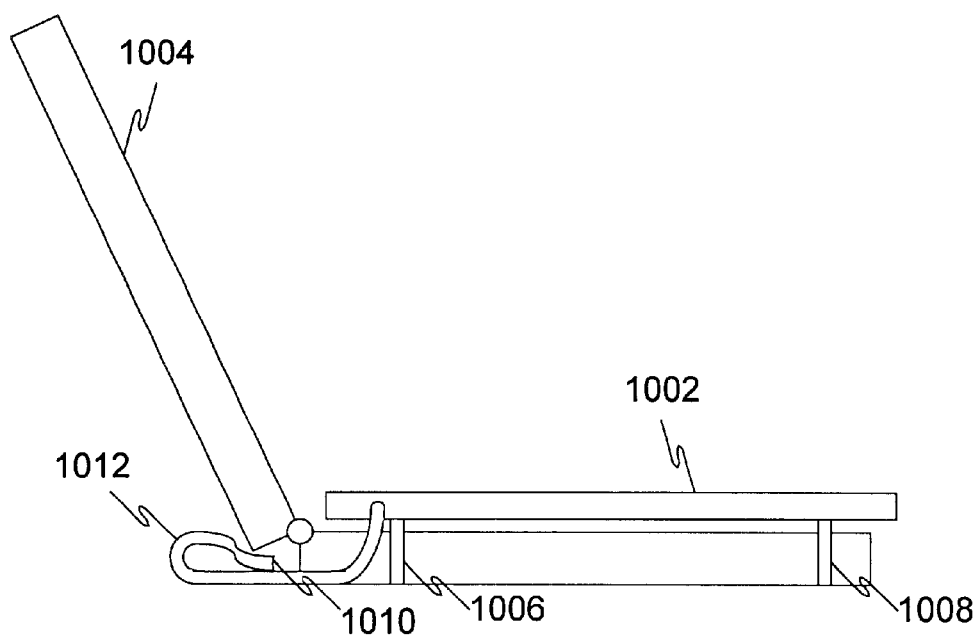

Many different portfolio configurations are also suitable for use in a handwriting capture system. For example, FIG. 10 shows a portfolio 902 that is a block-like case having an ink capture device 904 mounted on one side and an image capture device such as PDA 906 mounted on the other side in a cavity. The infrared port (not shown) of the portfolio 902 is built into the cavity. FIG. 11 shows a portfolio 1002 that is particularly suitable for use with a notebook computer 1004. An ink capture device is mounted on the top side of portfolio 1002, and collapsible supports 1006 and 1008 extend from the bottom to position the portfolio over the keyboard of the notebook computer 1004. An infrared port module 1010 is located at the end of a "goose neck" flexible rod 1012 that extends from the portfolio 1002 and is positioned proximate to the infrared port of the notebook computer 1004. The length of the goose neck rod is sufficient to reach all points on a notebook computer at which an infrared port is likely to be located. The collapsible supports 1006 and 1008 are illustrative, and any of a variety of other supports may be used to maintain the portfolio 1002 in a position over the keyboard of the notebook computer 1004. Preferably, the supports of the portfolio 1002 are such that the portfolio 1002 is movable away from the computer so that keyboard data entry may be done if desired. The goose neck flexible rod 1012 is also illustrative, and any of a variety of other techniques may be used to bring the infrared port module 1010 into proximity with the infrared port of the notebook computer 1004. For example, the infrared port module 1010 may be a simple block that is attached to the portfolio 1002 by a cable and simply placed on a surface near the infrared port of the notebook computer 1004, or may be a suction cup with an imbedded infrared transceiver that is attached to the portfolio 1002 by a cable and simply placed over the infrared port of the notebook computer 1004. Alternatively, the infrared port may be located inside of the portfolio 1002 and a fiber optic cable may be used to reach the infrared port of the notebook computer 1004.

Figure 12:
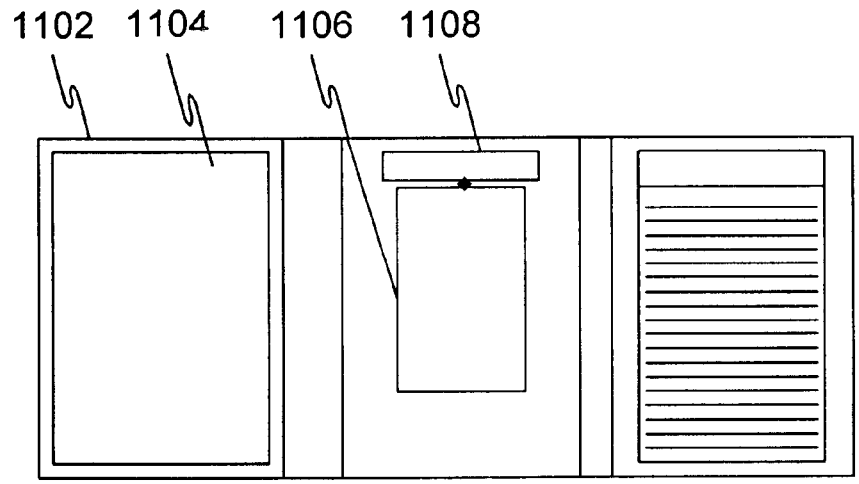
Figure 13:
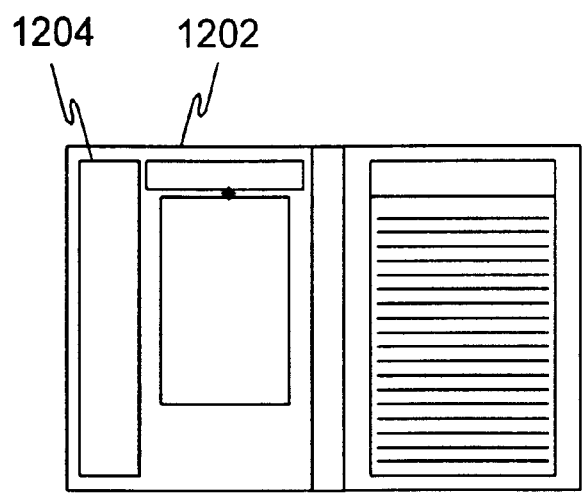

The portfolio may also contain other elements. For example, FIG. 12 shows a portfolio 1102 that contains a third panel on which is mounted a display screen of any suitable type; a TFT screen or an electronic paper screen are examples. Suitable electronics well known in the art are built into the third panel to drive the display 1104 based on signals 20 from, for example, a PDA 1106 either through its infrared port or through another port (not shown). FIG. 13 shows a portfolio 1202 that includes a storage container 1204 suitable for holding spare batteries, a spare stylus and/or pen, an A/C power supply, and so forth.

Figure 14:
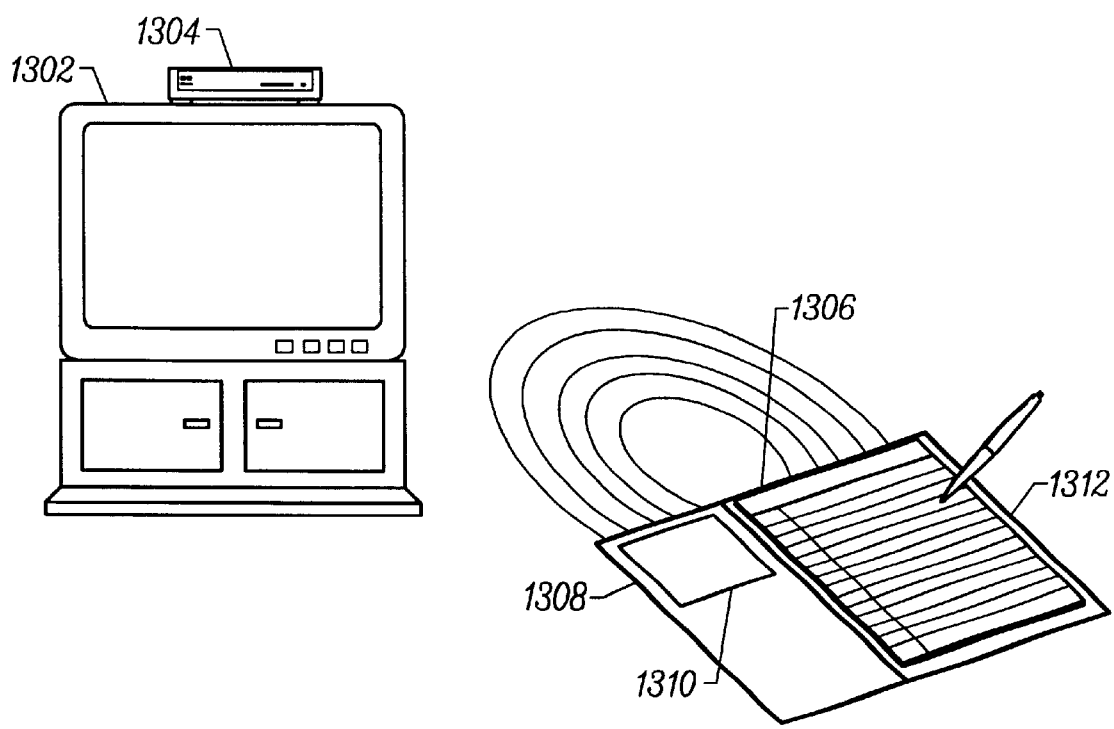
FIG. 14 is a perspective view of a handwriting capture system used with a set top box.

Handwriting capture systems also are useful for providing input to other types of communication devices, including devices such as television set top boxes and smart televisions which may be oriented toward the World Wide Web. FIG. 14 shows a single panel portfolio 1308 which contains a ink capture device 1312 and a high power narrow beam infrared transceiver 1306 of a type commonly used in television remote control units. An infrared link is established with a set top 1304 which is conventionally linked to a television 1302. The infrared link and data transmissions are controlled in the portfolio 1308 by a suitably programmed internal microcontroller, with navigational input being entered through a navigation area 1310 or, alternatively, through the ink capture device 1312 itself. The set top box 1304 functions as an image capture device, and also provides some or all of the viewing, organization, and communications capabilities described elsewhere in this document. The power level of the infrared transceiver 1306 is controllable if desired using, for example, the power setting method shown in FIG. 5.

Many of the portfolio configurations described elsewhere in this document may be modified to support an infrared link with a set top box, with other portfolios, with PDAs and notebook computers, and other such image capture devices. For example, the infrared transceiver module 40 (FIG. 1) may be provided with a second infrared port 44 facing out of the portfolio for external communications. Similarly, the infrared transceiver module 1010 (FIG. 11) may be provided with a second outward facing infrared port. Communications through the second infrared port are controlled by the image capture device if present, or by the onboard microcontroller if the image capture device is removed. A physical switch or other control (not shown) may be provided on the infrared transceiver module or on the portfolio to activate or deactivate the second infrared port, as desired, or the switch may be implemented in software. The power level of the second infrared port 44 is controllable if desired using, for example, the power setting method shown in FIG. 5.

While an infrared link is a particularly useful type of link for a portable handwriting capture system because of its low cost, good durability, and high resistance to interference, some radio frequency ("RF") technologies have been developed for low power short distance communications and are suitable for use in portable handwriting capture systems in place of the infrared links. An example of such a technology is the Jini™ connection technology which is available from Sun Microsystems, Inc. of Mountain View, Calif. Known techniques such as secure addressing schemes and frequency hopping allow many devices to be in communication locally without interference.

The description of the invention set forth herein is illustrative and is not intended to limit the scope of the invention as set forth in the following claims. Variations and modifications of the embodiments disclosed herein are possible, and alternatives and equivalents of the various elements of the embodiments are known to those of ordinary skill in the art. These and other variations and modifications of the embodiments disclosed herein may be made without departing from the scope and spirit of the invention as set forth in the following claims.

What is claimed is:

1. A portable handwriting capture apparatus for use with a portable image capture device having an infrared port, comprising:

a portable structural supporting medium;

an ink capture device mounted on the structural supporting medium;

an infrared port module mounted on the structural supporting medium;

an infrared communications circuit wired to the ink capture device and having an infrared transceiver mounted in the infrared port module for wirelessly communicating pen stroke data from the ink capture device in real time; and an image capture device mounting mechanism, the infrared port of the infrared port module being directed toward the capture device mounting mechanism.

2. An apparatus as in claim 1 wherein the structural supporting medium comprises a portfolio having:

a first panel, the ink capture device being mounted on the first panel; and a second panel, the image capture device mounting mechanism and the infrared port module being mounted on the second panel.

3. An apparatus as in claim 2 further comprising a spine, a first hinge coupling the first panel to the spine, and a second hinge coupling the second panel to the spine, wherein the spine comprises a battery compartment coupled to the ink capture device and the infrared communications circuit.

4. An apparatus as in claim 1 wherein the ink capture device comprises an electromagnetic digital note pad.

5. An apparatus as in claim 1 wherein the ink capture device comprises a resistivity digital note pad.

6. An apparatus as in claim 1 wherein the ink capture device comprises a laser digital note pad.

7. An apparatus as in claim 1 wherein the infrared communications circuit comprises an infrared transceiver coupled to an infrared interface.

8. An apparatus as in claim 1 further comprising an additional infrared communications circuit having an additional infrared transceiver mounted in the infrared port module and having an optical path traverse to a nearest edge of the structural supporting medium.

9. An apparatus as in claim 1 wherein the image capture device mounting mechanism comprises a pair of clips mounted to the structural supporting medium.

10. A portable handwriting capture apparatus comprising:

a portable portfolio having at least a first panel and a second panel;

an ink capture device mounted on the first panel;

an infrared port module mounted on the second panel;

an infrared communications circuit wired to the ink capture device and having a first infrared transceiver mounted in the infrared port module for wirelessly communicating pen stroke data from the ink capture device in real time; and an image capture device removably mounted on the second panel, the image capture device having a second infrared transceiver operationally aligned with the first infrared transceiver for receiving the pen stroke data from the ink capture device in real time.

11. An apparatus as in claim 10 further comprising a spine, a first hinge coupling the first panel to the spine, and a second hinge coupling the second panel to the spine, wherein the spine comprises a battery compartment coupled to the ink capture device and the infrared communications circuit.

12. An apparatus as in claim 10 wherein the image capture device comprises an notebook computer, and the ink capture device comprises a removable paper writing surface.

13. An apparatus as in claim 10 wherein the image capture device comprises a personal data assistant, and the ink capture device comprises a removable paper writing surface.

14. An apparatus as in claim 1 wherein the structural supporting medium comprises a portfolio having:

a first panel, the ink capture device being mounted on the first panel;

a second panel, the image capture device mounting mechanism and the infrared port module being mounted on the second panel; and a third panel.

15. An apparatus as in claim 14 wherein the third panel comprises a display screen, the display screen being electronically coupled to the image capture device.

16. An apparatus as in claim 1 wherein the structural supporting medium comprises a portfolio having:

a first panel, the ink capture device being mounted on the first panel;

a second panel, the image capture device mounting mechanism and the infrared port module being mounted on the second panel; and a storage container.

* * * * *